June 2, 1970 — C. J. ULRICH — 3,515,017

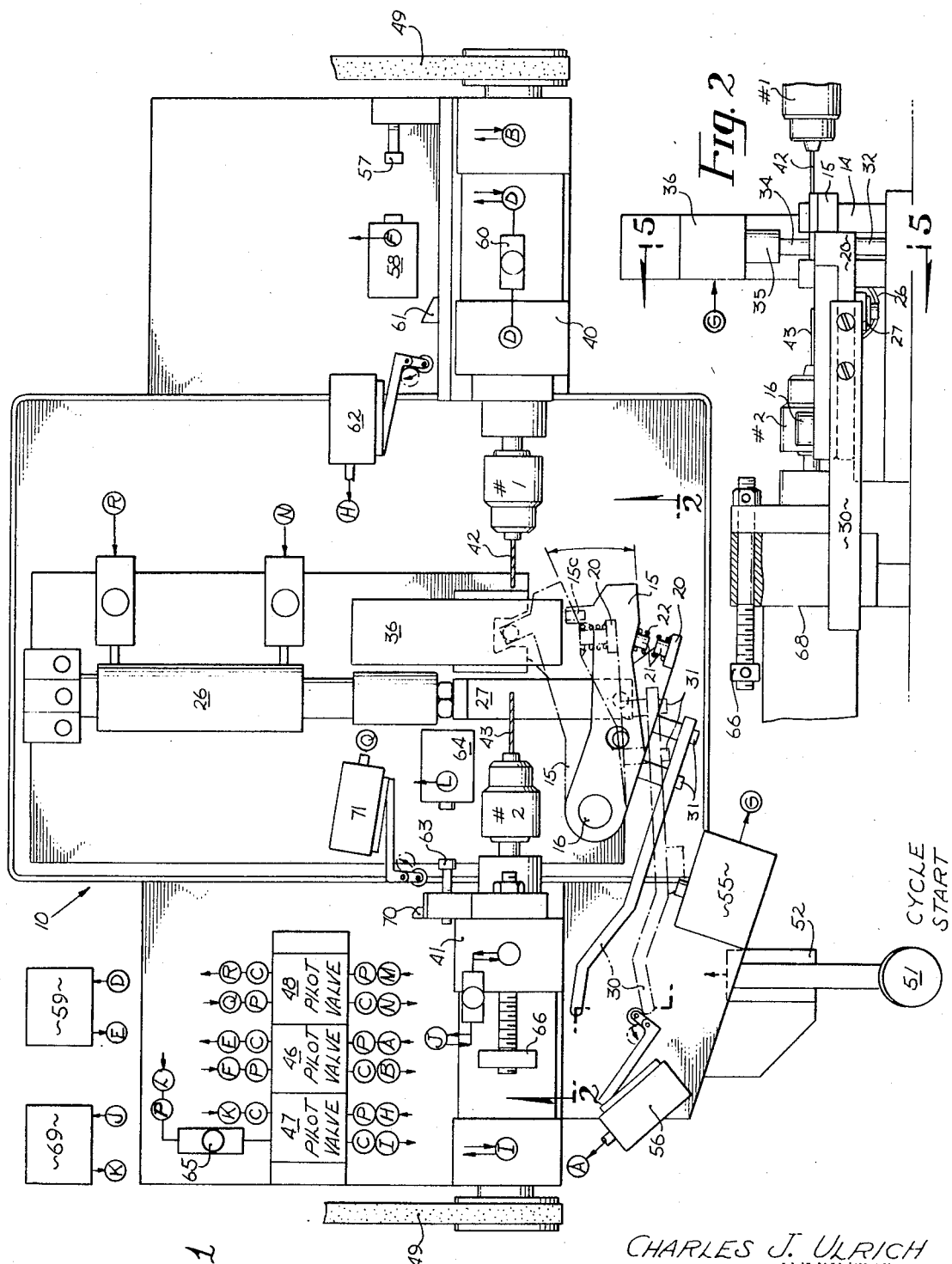

DRILLING APPARATUS

Filed May 22, 1968 — 2 Sheets-Sheet 2

CHARLES J. ULRICH
INVENTOR

BY Knight & Rodgers
ATTORNEYS

United States Patent Office 3,515,017
Patented June 2, 1970

3,515,017
DRILLING APPARATUS
Charles J. Ulrich, 11423 Van Owen,
North Hollywood, Calif. 91605
Filed May 22, 1968, Ser. No. 731,224
Int. Cl. B23b 47/28
U.S. Cl. 77—63
8 Claims

ABSTRACT OF THE DISCLOSURE

Drilling apparatus for boring and counterboring small parts has a drilling fixture of novel design for holding the workpiece in exact orientation during the drilling operation. The fixture is hand-loaded but drilling cycle is automatic to termination when the cycle is automatically stopped.

BACKGROUND OF THE INVENTION

The present invention relates generally to drills and drilling apparatus; but it is more particularly concerned with apparatus for boring and counterboring small parts, particularly when the part has a circular cross section, with the requirement that the drill bores be accurately located with respect to certain fixed elements of the workpiece.

A small part of cylindrical shape is very difficult to hold in an exact position, particularly when it is to be engaged in a manner that precludes the possibility of any damage to the surface finish. This eliminates the possibility of using jaws with teeth or the like. The present invention has been designed with a particular part in mind in which the workpiece is of a circular cross section and of generally disc-like shape. A bore and a counterbore pierce the part transversely of the axis and must be located within very close tolerances. The bore is necessarily located with reference to a fixed projection on the part.

It is a general object of the invention to provide a drilling fixture which is suitable to handling a part of this character, or other parts of a specific design, and performing the drilling operation with a high degree of accuracy and rapidity. This enables the high production rate to be maintained, even without automatic feed or loading of the drilling apparatus, without the penalty of a large proportion of rejections because of inaccurate work.

It is also a general object of the invention to provide drilling apparatus of this general character which is simple in construction and operation without sacrifice of the other advantages named above.

SUMMARY OF THE INVENTION

The above objects and advantages of the present invention are achieved in a drilling fixture embodying the present invention which comprises a base on which are mounted a pair of work engaging jaws. One jaw is stationary, and the other jaw swings, preferably in a horizontal arc toward and away from the stationary jaw. Means for actuating the swinging jaw include a pivotally mounted operating arm, a resilient connection between the swinging jaw and the arm to move the swinging jaw in response to arm movement, yet allowing limited relative travel, referred to as over-travel, after the jaws engage the workpiece. Cooperating stop means on the arm and the swinging jaw engage to apply positive pressure on the workpiece and also to carry the swinging jaw away from the workpiece.

In order to hold the workpiece firmly during the drilling operation, means are provided exerting a downward thrust on the workpiece when it is in drilling position, while an anvil under the swinging jaw resists the downward thrust in order to locate the workpiece vertically. Held thus and between the jaws, the workpiece is located accurately both horizontally and vertically in position for drills to bore in sequence from opposite sides of the workpiece to place a bore and a counterbore in the workpiece transverse to the axis of the workpiece.

A control system is provided to carry on the drilling cycle automatically, this control system embodying an air-hydraulic system in which movements of the drills actuate certain pilot valves that in turn control the flow of operating air or hydraulic fluid in the system.

DESCRIPTION OF THE DRAWING

How the above objects and advantages of the present invention, as well as others not specifically referred to herein, are attained, will be more readily understood by reference to the following description and to the annexed drawing, in which:

FIG. 1 is a plan view of the drilling apparatus with major elements of the control system indicated;

FIG. 2 is a partial elevation on line 2—2 of FIG. 1;

DESCRIPTION OF A PREFERRED EMBODIMENT

Figure 3:
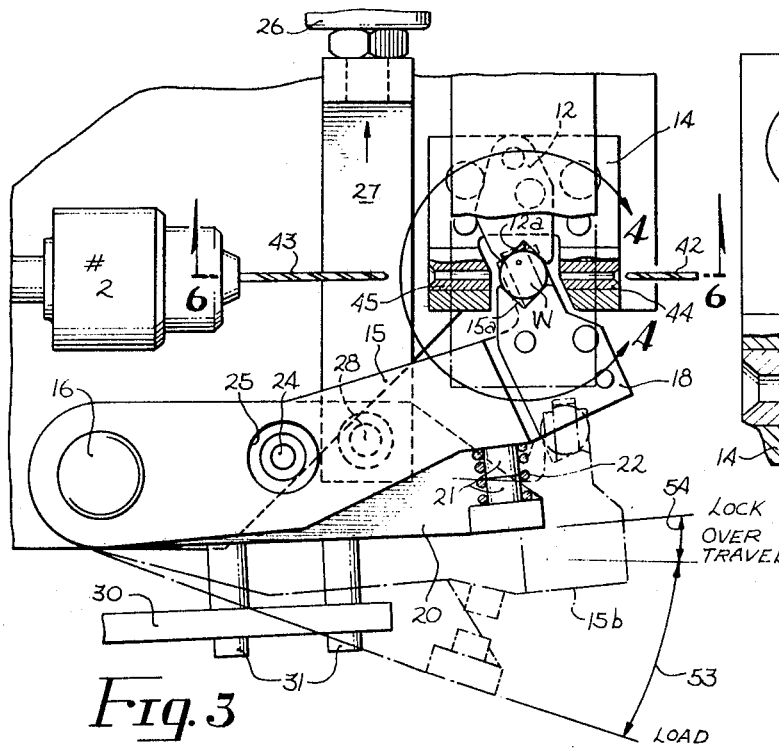
FIG. 3 is an enlarged fragmentary plan view of the jaws and the operating arm therefor.

Referring now to the drawing, and more particularly to FIG. 1, it will be seen that there is shown therein drilling apparatus constructed according to the present invention. The parts are mounted on a base indicated generally at 10 which may be of any suitable design and provides a frame or foundation upon which the various parts can be mounted to maintain their relationship with each other.

Figure 4:
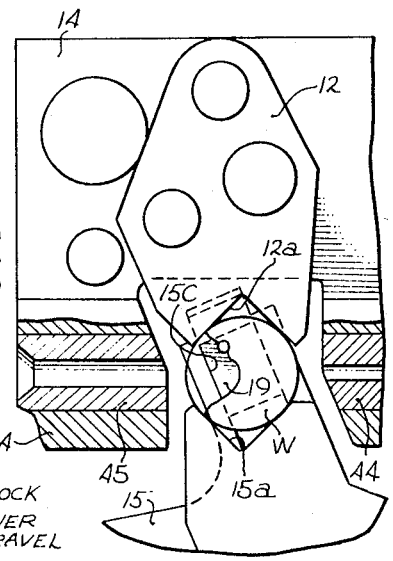
FIG. 4 is a still further enlarged fragmentary plan and horizontal section within the area 4—4 of FIG. 3.
Figure 5:
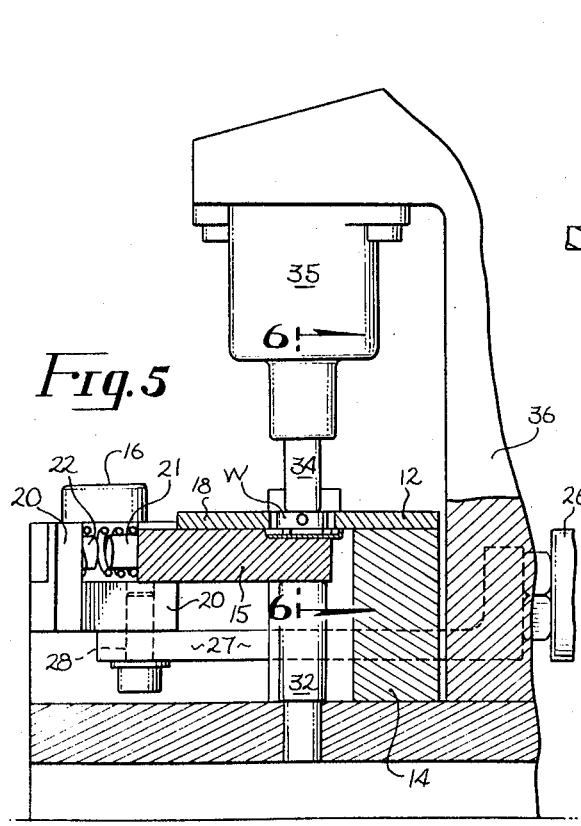
FIG. 5 is a fragmentary vertical section on line 5—5 of FIG. 2.

Centrally of the base is located fixed jaw 12 shown particularly in FIGS. 3, 4, and 5. This jaw is typically a plate having a V-shaped notch 12a in one side thereof and mounted on top of post 14.

Cooperating with stationary jaw 12 to engage and hold the workpiece W is movable jaw 15 which also is provided at one side with a V-shaped notch 15a. The workpiece W will be seen to be circular in plan and the two V-shaped notches receive the workpiece and engage it at four points to position it horizontally. Notches 12a and 15a are preferably straight-sided notches with sides at 90° to each other so that the two jaws engage the workpiece at diametrically opposite positions.

Jaw 15 is pivotally mounted at 16 on the base to swing in a generally horizontal arc between the loading position 15b in broken lines in FIG. 3 and the work holding position shown in solid lines. The range of movement of jaw 15 is sufficient that when away from the stationary jaw, access is had to the movable jaw for manual loading and unloading of the workpiece.

Notch 15a on the swinging jaw is preferably provided by an edge recess in plate 18 attached to the upper face of the jaw. Immediately below notch 15a, the jaw is provided with a recess 15c which opens to one edge of the jaw and has two parallel side faces. These parallel side faces are adapted to receive between them a projection on the bottom of workpiece W and, by engaging the sides of projection 19, to orient the workpiece precisely in the swinging jaw with respect to this projection 19 on the workpiece. Since the jaw moves over an arc into a predetermined drilling position, the workpiece is thereby oriented also with respect to the drills, mentioned later.

In order to actuate the swinging jaw, there is provided beneath the jaw and pivotally mounted on base 10 concentrically therewith at 16, operating arm 20. Arm 20 and jaw 15 carry stop means in the form of a pair of cooperating abutment members 21 which engage, as shown in the full line position of FIG. 3, to permit positive pressure to be exerted by arm 20 on jaw 15 for the purpose of holding the workpiece in drilling position between the two relatively movable jaws. Surrounding the two abutment members 21 is a coil spring 22 in compression which normally urges the jaw and the arm apart and provides a resilient connection between these two pivotally mounted members which permits the arm to move the jaw toward the workpiece and then compresses to permit limited relative travel of arm 20 with respect to jaw 15 after the workpiece is locked in drilling position, as will become apparent.

A second abutment or stop means is provided to limit relative reverse travel of the arm and swinging jaw. This may take the form of bolt or pin 24 mounted on arm 20 and projecting upwardly with clearance through an opening 25 in the swinging jaw. The larger diameter of opening 25 is so selected that bolt 24 engages the wall of opening 25 as shown in full lines in FIG. 1 after spring 22 has expanded by a desired amount. While it is possible to have pin 25 also assume the functions of the two abutments 21, separation of the stop means into two separate pairs of engaging members is preferred for practical reasons since this permits close regulation of the range of movement between the arm and jaw by adjustment of abutment 21.

Power for moving operating arm 20 is supplied by double-acting air cylinder 26 of which the piston rod is connected to one end of link 27, while the other end of link 27 is pivotally connected at 28 to arm 20.

Operating arm 20 includes an extension in the form of bar 30. Bar 30 could be an integral part of arm 20, but it is more convenient to provide a separate bar which is attached to arm 20 by bolts 31 in order that bar 20 may be given the desired length and shape to operate valves or switches, as will become more fully apparent, without necessitating any machine operations on the remaining portion of arm 20.

Figure 6:
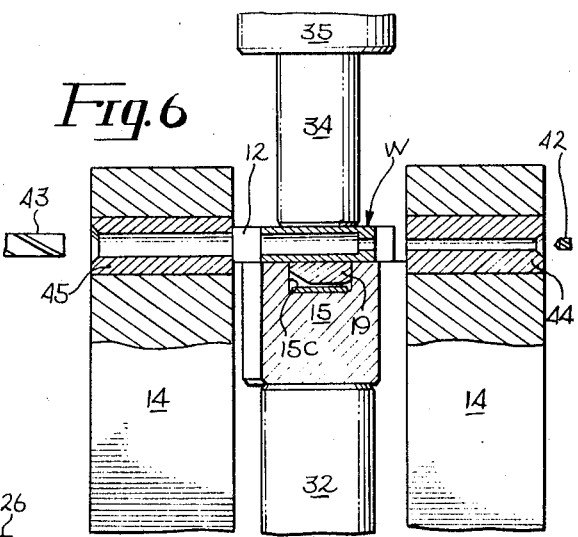
FIG. 6 is a further enlarged fragmentary section through the jaws holding a workpiece, as indicated by lines 6—6 in FIG. 5.

When workpiece W is locked firmly between the fixed and movable jaws, as shown in FIG. 4, the workpiece is in the position to be drilled. In order to orient the piece accurately in a vertical direction, in addition to the orientation horizontally by jaws 12 and 15, there is provided a pair of vertically cooperating members illustrated in FIGS. 5 and 6. These comprise a lower anvil 32 mounted upon base 10 at such a position that swinging jaw 15 rides onto anvil 32 when the jaw is in the advanced or closed work engaging position. This anvil is adapted to receive the downward thrust of a hold-down means comprising plunger 34 which is raised and lowered by a single-acting spring return air, spring-biased cylinder 35. Cylinder 35 is mounted on supporting bracket 36 and positioned to be directly over the workpiece when locked between jaws 12 and 15. It will be noticed in FIG. 6 that recess 15c in jaw 15 is slightly deeper than the projection 19 of the workpiece so that the workpiece is supported on the upper surface of jaw 15 and the thrust from hold-down member 34 passes directly through the workpiece to jaw 15 and thence to anvil 32 which engages the under face of jaw 15.

Drilling through workpiece W is accomplished by a pair of opposed drills 40 and 41 each having a chuck of suitable design holding, respectively, drill bits 42 and 43. In order to guide and accurately locate the two drill bits 42 and 43, which are concentric with each other, there shown especially in FIGS. 4 and 6. These bushings are located in forwardly extending portions of post 14. They are provided suitable coaxial drill bushings 44 and 45, as are preferably a press-fit in bores in the posts in order that the drill bushings can be removed for replacement and service, as may be desired.

Drills 40 and 41 are driven independently from separate power sources, not shown in the drawings, such as electric motors, power being delivered to the drills by separate belts 49. These drive belts are trained over pulleys on the ends of the drill spindles. Drill bits 42 and 43 are each advanced toward the workpiece and retracted by means of a double-acting air-hydraulic cylinder incorporated in each of the drills 40 and 41. This drill construction is not illustrated in detail since any suitable type of drill mechanism may be used for this purpose and suitable constructions are well known in the art. For this purpose, each of the drills is provided with a pair of connections to lines by which air or hydraulic fluid under pressure is delivered to the drill feed cylinders from suitable sources (not shown in the drawing).

To advance and retract drill bits 42 and 43 in timed sequence as well as to control other operations of drilling apparatus, there is provided an air-hydraulic control system which includes a source of air under pressure, not shown in the drawing, since any suitable source may be employed. In FIG. 1, the air and hydraulic connections to the various elements of the system, such as the drills, operating cylinder, valves, and the like are shown, but the lines themselves are omitted in the interest of clarity of illustration. In order to disclose the control system in its entirety, the various connections are indicated by a capital letter in a circle, the two points connected by a fluid line being indicated by the same capital letter. The flow of hydraulic operating fluid to and from the hydraulic cylinders of drills 40 and 41, is controlled by air-actuated pilot valves 46 and 47, respectively, having pilot ports P for control air and cylinder ports C for operating air. A similar pilot valve 48 with similar ports controls flow of air to operating cylinder 26 which opens and closes the work holding jaws. Control air is applied to the pilot valves by remote valves, as will be pointed out, which are actuated by movements of the various parts of the apparatus to carry on a complete cycle of operations.

With this brief background of the control system, in mind, the operation of the apparatus will be described.

With the jaws open in the full line position of FIG. 1, a workpiece W is loaded onto the swinging jaw by placing the piece in such position that the projection 19 is on the under side of the workpiece and is received within recess 15c which precisely orients the workpiece with respect to the swinging jaw. Loading is done by hand, although the invention is not necessarily so limited.

The operating cycle is now started by manually depressing cycle start button 51 which opens air valve 52, and this in turn actuates pilot valve 48 to cause cylinder 26 to close the swinging jaw. Movement of the jaw is counterclockwise, as viewed in FIG. 1, to the locked or clamping position of FIG. 3.

As the operating arm 20 starts its swinging movement in response to actuation by cylinder 26, motion of the operating arm is transmitted to jaw 15 through the resilient connection afforded by spring 22. This pushes jaw 15 ahead of and at the same rate as arm 20 through the initial movement indicated by the arc at 53. At the end of this travel, workpiece W has been brought into contact with fixed jaw 12 and the workpiece is lightly in contact with both jaws but is not yet firmly held for drilling. While this contact between the workpiece and the two jaws stops travelling jaw 15 from further movement, operating arm 20 can continue to move through the arc indicated at 54 in FIG. 3 which may be conveniently referred to as the over-travel of the arm, that is, it is the travel of the operating arm permitted by compressing the resilient connection 22 after the workpiece, by engagement with the fixed jaw, stops the advancing movement of the travelling jaw.

The end of the over-travel 54 is reached when the two abutments 21 contact with each other and thereafter operating arm 20 exerts a positive force through these abutments on jaw 15 to hold the workpiece firmly clamped between the two jaws, more particularly between the two V-shaped notches on the jaws. This is the clamping or locked position of the jaws indicated at the end of the arc 54 in FIG. 3.

Just before the lock position is reached, extension 30 of operating arm 20 engages air valve 55, opening the valve and supplying air under pressure through connections G to cylinder 35, forcing plunger 34 down into contact with the top surface of workpiece W. Vertical deflection of arm 15 is eliminated by engagement of the under side of the arm with the top of the anvil 32. Thus, when hold-down 34 reaches the end of its stroke, the workpiece is firmly held and accurately positioned both horizontally and vertically.

At the end of the stroke of arm 20, extension 30 of the operating arm engages the arm of air valve 56, opening the valve to supply air to pilot valve 46. This valve is opened, supplying air under pressure through the connections B to the hydraulic cylinder which advances drill 40 with bit 42. Drill bit 42 engages and passes through workpiece W, boring a small hole therethrough. The drill advances until stop 57 advancing with the spindle of drill 40 engages valve 58. This is an air valve which, upon opening, actuates pilot valve 46 to shut off the supply of operating air and reverse the flow of hydraulic fluid from the drill 40, thereby causing the drill to retract to the position of FIG. 1.

Hydraulic fluid leaving the cylinder of drill 40 through pilot valve 46 during drill advance flows into reservoir 59, as indicated by the connections D and E. Reservoir 59 is maintained under air pressure sufficient to return fluid to the drill and cause drill 40 to retract. The rate of drill feed is regulated by a simple flow regulating valve 60, such as a needle valve which is manually adjustable.

Attached to the drill spindle to move therewith is cam block 61 which engages air valve 62. On the forward stroke, the arm of the air valve yields, but as the spindle retracts, cam block 61 trips valve 62, actuating pilot valve 47 to advance the spindle of drill 41 with bit 43. Bit 43 moves forward until stop 63 on the drill spindle engages air valve 64. This, through line L, actuates pilot valve 47 to retract drill 41. Bit 43 is of larger diameter than bit 42 and counterbores the workpiece as may be seen to best advantage in FIG. 6.

It is desirable that the end of the counterbore be located within very narrow tolerances, closer than can ordinarily be determined by operation of valve 61 alone. For this reason, air line L is provided with an adjustable flow restriction 65 which slows up the reaction of pilot valve 47 to allow bit 43 to continue to advance by a few thousandths of an inch. This amount of continued advance or overtravel is sufficient to bring adjustable stop 66 into engagement with the opposing face 68 of a fixed abutment on the drill. This engagement with abutment face 68 limits the forward travel of bit 43 and locates accurately the bottom of the counterbore in the workpiece. The reaction of pilot valve 43, delayed by the action of flow restrictor 63, then causes retraction of drill 41. Drill 41 is connected to reservoir 69 which is similar to reservoir 59 and, during advance of the drill bit accumulates fluid under pressure. This fluid is then returned through connection I and the pilot valve to retract bit 43.

During the forward movement of the spindle drill 41, cam block 70 engages the operating arm of valve 71; but the arm yielded during the forward engagement. However, on the retracting movement of this spindle, valve 71 is tripped open and, through line Q, actuates pilot valve 48 to reverse the flow to operating cylinder 26, thereby opening jaw 15.

More exactly, cylinder 26 first moves operating arm 20 back through the range of the over-travel indicated at 54, in the reverse direction to that movement first described. During this period, the expansion of spring 22 delays movement of jaw 15 and holds the jaws in engagement with the workpiece. This movement of the operating arm alone, jaw 15 remaining stationary, ends when bolt 24 in hold 25 engages the jaw and carries it with operating arm in a clockwise direction (viewed in FIG. 3) through arc 53 to the fully open position. An arm 20 moves away from the closed position, the arm extension 30 releases valve 55, allowing hold-down 34 to rise and release the workpiece. It will be noted that the workpiece is released by the hold-down before jaw 15 commences its retraction motion so that the workpiece is free to be carried with the jaw back to the loading position at which position the completed workpiece can be discharged manually from the swinging jaw.

It will be apparent from the foregoing description that various changes in the precise arrangement and construction of the component parts of the drilling apparatus or the sequence of operations may occur to persons skilled in the art but without departing from the spirit and scope of the present invention. Accordingly, it is to be understood that the foregoing description is considered to be illustrative of, rather than limitative upon, the invention as defined by the appended claims.

I claim:
1. A drilling fixture adapted to hold a workpiece during the operation of drilling a hole in the part, comprising:
   a base;
   a pair of work engaging jaws mounted thereon of which one jaw is pivotally mounted on the base for swinging movement toward and away from the other jaw;
   and means to actuate the movable jaw, including a movably mounted operating arm pivotally mounted on the base.
   a resilient connection between the movable jaw and the operating arm initially moving the jaw in response to arm movement yet allowing limited continued travel of the arm when the movable jaw is in engagement with the workpiece;
   and cooperating stop means on the arm and movable jaw engaged at the end of said continued travel of the arm toward the movable jaw to exert positive pressure thereby on a workpiece held between the jaws.

2. A drilling fixture as in claim 1 in which the movable jaw and the movable arm are pivotally mounted on the base concentrically of each other.

3. A drilling fixture as in claim 1 in which the movable jaw and arm swing horizontally about a vertical axis, and that also includes:
   means exerting a downward thrust on the workpiece when gripped by said jaws;
   and a stationary anvil onto which the movable jaw slides when the movable jaw is in gripping position to resist said downward thrust.

4. A drilling fixture as in claim 1 in which the movable jaw has a work gripping portion and also means for angularly orienting the workpiece on the jaw with respect to the work gripping portion.

5. A drilling fixture adapted to hold a workpiece during the operation of drilling a hole in the piece, comprising:
   a base;
   a pair of workpiece holding jaws mounted on the base, one jaw being stationary and the other jaw being pivotally mounted to swing toward and away from the stationary jaw;
   means to actuate the swinging jaw;
   a stationary support slidably engaged by and supporting the swinging jaw when the swinging jaw is in advanced position to grip a workpiece between the jaws;
   and means exerting a thrust against the workpiece in a direction transverse to the plane of swing movement of the jaw and toward said support to hold the workpiece firmly during the drilling operation.

6. A drilling fixture adapted to hold a workpiece during the operation of drilling a hole in the piece, comprising:
   a base;
   a pair of workpiece holding jaws mounted on the base and each having one of a pair of opposed workpiece gripping surfaces, one jaw being stationary and the other jaw being pivotally mounted to swing horizontally toward and away from the stationary jaw;
   means to actuate the swinging jaw;
   workpiece supporting means on and movable with the swinging jaw;
   and a guide shoulder on the swinging jaw offset from the workpiece gripping surface thereon and engaging the workpiece to orient the workpiece angularly relative to the swinging jaw and to place the workpiece in a predetermined position when held by and between the jaws.

7. A drilling fixture as in claim 6 that also includes a stationary support slidably engaged by and underneath the swinging jaw when the swinging jaw is advanced to a position in which a workpiece is held between the jaws to support the swinging jaws against forces transverse to the plane of swinging movement.

8. A drilling fixture as in claim 1 that also includes:
   a stationary anvil onto which the movable jaw is moved at the end of travel thereof produced by said operating arm; and
   means engaging the workpiece to exert a downward thrust thereon in the direction of the anvil prior to engagement of the cooperating stop means.

References Cited

UNITED STATES PATENTS

| | | | |
|---|---|---|---|
| 1,129,020 | 2/1915 | Saylor | 269—32 XR |
| 1,729,076 | 9/1929 | Laycock | 269—32 |
| 2,373,379 | 4/1945 | Brown | 77—63 |
| 2,518,086 | 8/1950 | Snorek | 269—25 XR |

FRANCIS S. HUSAR, Primary Examiner

U.S. Cl. X.R.

77—5, 21; 269—25, 32